W. H. FISH, Jr.
Corn Planter.

No. 77,808.

Patented May 12, 1868.

Witnesses:

Inventor:

United States Patent Office.

WILLIAM H. FISH, JR., OF SCARSDALE, NEW YORK.

Letters Patent No. 77,808, dated May 12, 1868.

IMPROVEMENT IN CORN-PLANTER.

*The Schedule referred to in these Letters Patent and making part of the same.*

TO ALL WHOM IT MAY CONCERN:

Be it known that I, WILLIAM H. FISH, Jr., of Scarsdale, in the county of Westchester, and State of New York, have invented a new and improved Corn-Planter; and I do hereby declare that the following is a full, clear, and exact description thereof, which will enable those skilled in the art to make and use the same, reference being had to the accompanying drawings, forming part of this specification.

This invention relates to a new and improved device for planting corn and other seed in hills; and it consists in a novel construction and arrangement of certain parts, as herein shown and described, whereby the seed may be dropped regularly at proper intervals.

In the accompanying sheet of drawings—

Figure 1:
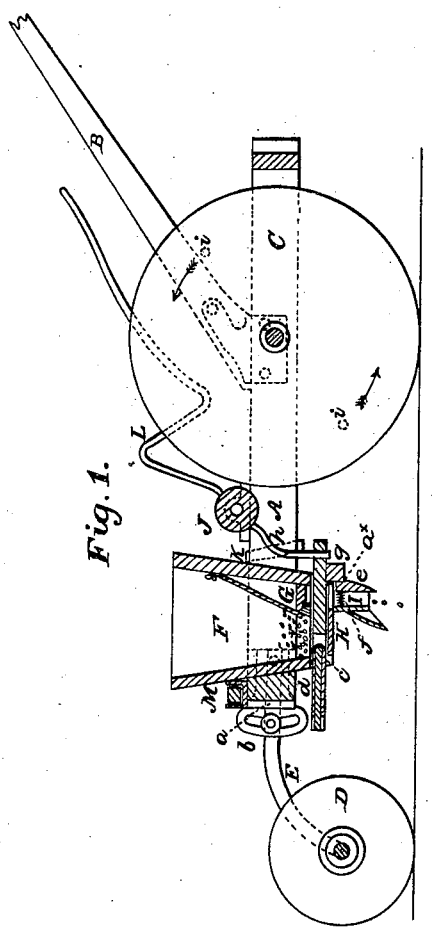

Figure 1 is a side sectional view of my invention.

Figure 2:
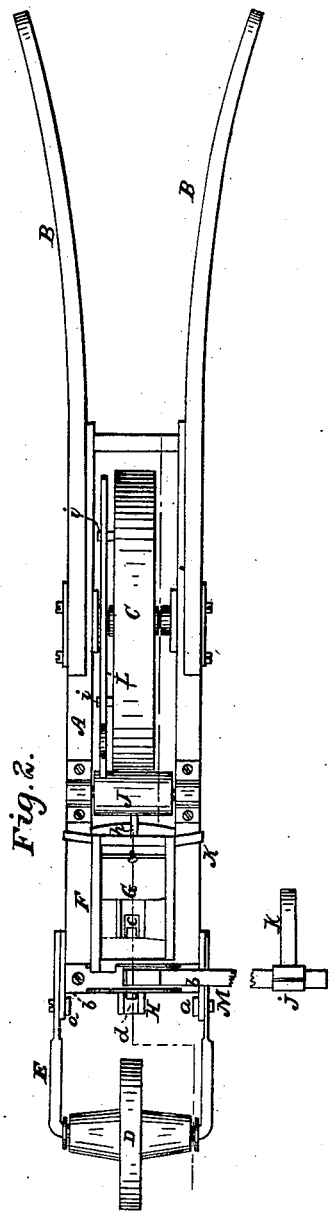

Figure 2, a plan or top view of the same.

Similar letters of reference indicate corresponding parts.

A represents the frame of the machine, which is of rectangular form, and is provided with two handles, B B; is supported at its rear part by a wheel, C, fitted within the frame, and its front part by a small wheel, D, which is fitted in a metallic frame, E, the inner ends of the sides of which are secured by bolts $a$ in segment-plates $b$ attached to each side of the front end of the frame A, by which the front end of the frame A may be adjusted higher or lower, as desired.

F is a hopper, which is fitted in the front part of the frame A, and has a cut-off, G, within it; and H is a seed-slide, which works in the bottom of the hopper, and has an aperture, $c$, in it, the capacity of which may be increased or diminished by an adjustable slide or gauge, $d$.

I is a short spout, which depends from the hopper F, and has a valve, $e$, pivoted in it at $a^\times$, a spring, $f$, in the spout bearing against the valve, and having a tendency to keep it closed, as will be seen by referring to fig. 1.

At the rear of the seed-slide H there is a pendent projection, $g$, which acts against the upper part of the valve, as the slide H approaches the termination of its forward movement, and opens said valve, the open position of the valve being shown in fig. 1.

J is a shaft in the frame A, directly back of the hopper F, said shaft having an arm, $h$, extending down from it, and passing through the rear of the slide H, the arm passing through an elastic band, K, on the frame, which serves as a spring, and has a tendency to keep the seed-slide H shoved forward.

L is a bent arm or lever, which extends upward at one side of the wheel C, which has two pins, $i\ i$, driven in it at equal distances apart, to act against the arm K and draw backward the seed-slide H, so that the seed may be discharged into the spout I, the spring K throwing the slide H forward each time a pin, $i$, passes the arm L.

The seed is discharged from the spout I each time the slide H reaches the termination of its forward movement, in consequence of the projection $g$ striking the upper end of the valve $e$.

In order to insure the seed being dropped evenly in check-rows, I employ a marker, composed of a bar, M, hinged to the front part of the frame A, and projecting from it at right angles. This bar M may be turned or adjusted so that it may project from either side of the frame A; and said bar has a slide, $j$, upon it, and this slide has a pendent bar, $k$, attached, which serves as a marker, as it makes a small furrow in the ground. The slide $j$ is adjustable on the bar M, to admit of the furrows being made a greater or less distance apart, as may be desired.

This machine has been practically tested, and has been found to answer an excellent purpose.

The marker insures the seed being planted even or regularly, in check-rows, and the seed may be dropped at a greater or less distance apart, by using wheels C of different diameters.

I claim as new, and desire to secure by Letters Patent—

1. The valve $e$ in the spout I, when arranged in connection with the seed-slide H, so as to be operated therefrom, substantially in the manner as and for the purpose specified.

2. The fitting of the small front wheel D in an adjustable frame, E, secured to the front part of the frame A in the manner substantially as and for the purpose set forth.

3. The combination of the two frames A E, when used in connection with a seed-dropping mechanism, substantially as shown and described.

The above specification of my invention signed by me, this 25th day of February, 1868.

W. H. FISH, Jr.

Witnesses:
   Wm. F. McNamara,
   Alex. F. Roberts.